United States Patent

[11] 3,572,614

| [72] | Inventor | William R. Bertelsen |
| | | 4343-18th Ave., Rock Island, Ill. 61201 |
| [21] | Appl. No. | 867,951 |
| [22] | Filed | Oct. 20, 1969 |
| [45] | Patented | Mar. 30, 1971 |
| | | Continuation of application Ser. No. 707,382, Feb. 14, 1968, now abandoned, which is a continuation of application Ser. No. 125,005, July 18, 1961, now abandoned, Continuation-in-part of application Ser. No. 652,298, Apr. 11, 1957, now abandoned. |

[54] AIRCRAFT
18 Claims, 32 Drawing Figs.

| [52] | U.S. Cl. | 244/12 |
| [51] | Int. Cl. | B64c 15/06, B64c 15/12 |
| [50] | Field of Search | 244/7, 12, 23, 34.1, 42, 41—102 |

[56] References Cited
UNITED STATES PATENTS

| 1,943,774 | 1/1934 | Shaw | 244/12 |
| 2,518,854 | 8/1950 | Badenoch | 244/42 |
| 2,918,233 | 12/1959 | Lippisch | 244/23 |
| 2,929,580 | 3/1960 | Ciolkosz | 244/12 |
| 2,954,943 | 10/1960 | DeLagabbe | 244/12 |

Primary Examiner—Milton Buchler
Assistant Examiner—Steven W. Weinrieb
Attorney—Henderson and Strom

ABSTRACT: The present invention relates to aircraft, and more particularly to structure and controls for aircraft adapted to take off and land in substantially the vertical direction. While not limited thereto, the preferred structure to be described in detail is of the canard type, and achieves at least the majority of control in empennage positioned forward of the main supporting surfaces and adjacent one or more rotors or propellers, or the like.

Patented March 30, 1971 3,572,614

WILLIAM R. BERTELSEN
INVENTOR

By [signature]

WILLIAM R. BERTELSEN
INVENTOR

WILLIAM R. BERTELSEN
INVENTOR

WILLIAM R. BERTELSEN
INVENTOR

By *J. D. Holmes*

WILLIAM R. BERTELSEN
INVENTOR

WILLIAM R. BERTELSEN
INVENTOR

WILLIAM R. BERTELSEN
INVENTOR

Fig. 32

WILLIAM R. BERTELSEN
INVENTOR

AIRCRAFT

This is a continuation of application Ser. No. 707,382 filed Feb. 14, 1968 and now abandoned, which in turn is a continuation of my copending application for an improvement in "Aircraft," Ser. No. 125,005, filed Jul. 18, 1961, now abandoned, which application constituted a continuation-in-part of Ser. No. 652,298, filed Apr. 11, 1957, now abandoned.

The present invention relates to aircraft, and more particularly to structure and controls for aircraft adapted to takeoff and land in substantially the vertical direction. While not limited thereto, the preferred structure to be described in detail is of the canard type, and achieves at least the majority of control in empennage positioned forward of the main supporting surfaces and adjacent one or more rotors or propellers, or the like.

Recent experiments with vertical takeoff and landing (abbreviated VTOL) aircraft have indicated phenomena uniquely related to the VTOL function. It has been found that craft constructed in the conventional manner, in order to obtain the VTOL function, require controls of different and presently undetermined order than now in use. The rotary wing helicopter, and the like, require both collective and cyclic controls, and are constrained to a maximum speed that is not high because the rotor blades advance and retreat in the relative wind, and attitude control is maintained in large part by the slow relative speed (retreating) blade. Tilt wing craft present entirely another kind of control problem for which no suggestion for a single control means is known. Other types will present additional problems now unknown.

Accordingly, it is a broad object of my invention to provide aircraft of controllable structure in a manner to obtain the VTOL function.

It is a further object of the invention to provide controls for aircraft constructed according to the preceding object. A more specific object is to provide controls for the aircraft constructed according to the first object that functions in the same sense to correct a given transitional function for both hovering and translational flight.

Other objects and advantages relate jointly and severally to the location and/or arrangement of parts, lift augmentation structure, and details of construction, and will be either obvious or pointed out in the following specifications and claims, and shown in the drawings, in which:

Referring more in detail to the drawings, FIGS. 1 through 6 show, in a diagrammatic way only, the forces acting on the VTOL aircraft. It is to be understood that the actual forces and force components are complex because of shift of the center of pressure; time rate of change (lag) due to inertia; and the aerodynamic jump in the wing structure to be described, and other factors such as gusts and pilot reaction, for example. The controls are required to control such aircraft both in vertical as well as translational operation. The attitude of the aircraft is such that the rotor slipstream activates the wing to produce lift. A line 30, FIG. 1, indicates diagrammatically rotor thrust, a line 31 indicates wing lift and a line 32 indicates the resolution of both thrust 30 and lift 31 which intersect in an area 33 which lies generally above the center of gravity CG of the aircraft.

Figure 1:
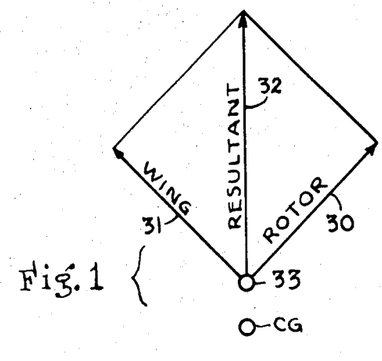
FIGS. 1 through 6 comprise diagrams of forces acting on the aircraft.
Figure 2:
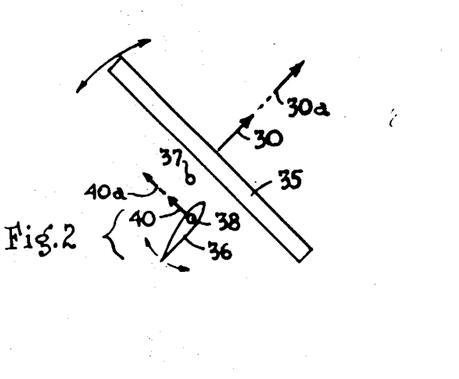
Figure 3:
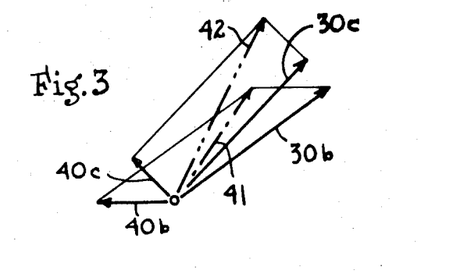

FIG. 2 diagrammatically shows a rotor 35 and an airfoil 36 pivoted about axes 37 and 38 respectively. The thrust 30 can be varied by varying the power input and pitch of the rotor 35 to provide a range of useful thrust 30a. The rotor can be tilted to cause the direction of thrust to lie within limits 30b and 30c, FIG. 3, for example. The airfoil 36 has a lift force 40 which will vary in a range 40a, FIG. 2 as additional air is blown over same in a given increment of time. The airfoil 36 can be rotated upon the pivot 38 to cause the direction of the lift force 40a to lie within limits 40b and 40c, FIG. 3, for example. The resultant of forces 30a and 40a will lie within limits in this example between force lines 41 and 42 for a given thrust of the rotor 35 upon rotation of the airfoil 36. By varying the rotor power a large number of force vectors are obtainable. Only two vectors 41a and 42a, FIG. 5, will be discussed in detail.

Figure 4:
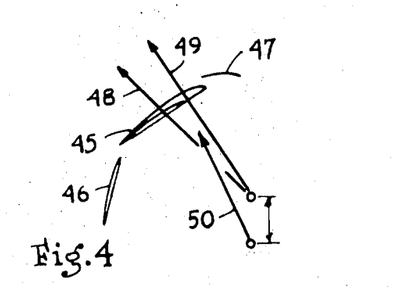

The main wing of the aircraft is indicated by airfoil sections 45 and 46 and slot flap 47, FIG. 4. The slipstream of the rotor 35 passes around these sections from the right to the left to cause a lift force at takeoff and landing that will vary with the airspeed between lines 48 and 49 due to direction of incidence of the air as well as drag variations due to the high angle of turning of the slipstream (70° to 90°). It is to be noted that the control airfoil 36 will also contribute net lift and drag also. In high speed flight this lift force might lie along a line 50.

Figure 5:
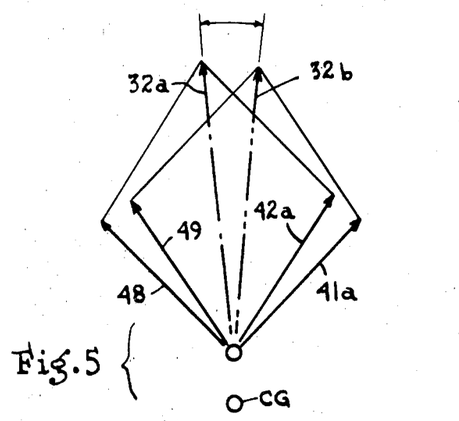

In takeoff and landing, the fore and aft vectors of forces 41a, 42a, 48 and 49, FIG. 5, are the major forces to consider. These have been shown as all equal for simplicity, although such condition is unlikely to exist in practice. It is to be noted that the range of effectiveness lying between lines 41a and 42a is greater than the range of change of wing lift lying between the lines 48 and 49. Thus the resultants 32a and 32b provide a control area therebetween of sufficient range to control the aircraft in accelerating, decelerating, and in gusts.

Figure 6:
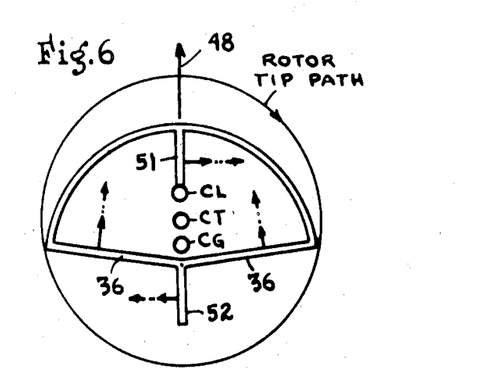

Lateral control, and rotor torque counteraction, is controlled by differential rotation of airfoils 36, an adjustable stabilizer 51, and a rudder 52, FIG. 6. In addition, the center of lift CL, the center of thrust CT, and the center of gravity CG are arranged so that the center of gravity CG is spaced below and with relationship to the other centers to provide a period of oscillation sufficiently short to cause righting to the vertical position at a rate faster than acceleration in the lateral directions. Dihedral and sweepback of the airfoils 36 will also contribute righting forces in hovering as well as forward flight. For torque counteraction, the several control elements 36, 51, and 52 can have built-in angle of incidence to the slipstream for forward flight conditions. Inasmuch as the slipstream will rotate in takeoff and landing, the control elements 36 and 52 are provided with means (to be explained below in detail) providing a wide range of movement.

A presently preferred small modification comprises a two passenger biplane of canard type and uses a flap structure with the main support wing that is pivoted at points on an arc to utilize tensioned structural members to attain a lightweight yet sturdy aircraft. Other larger structures embodying the broad structural features and the controls, will be described hereinafter.

Referring now to FIGS. 7 through 12, a body 60 has a forward occupant's portion 61, a rearward engine compartment 62 containing a pair of engines 63, a fuel and baggage compartment 64 and a cooling air duct 65. The body is faired to a rear edge 66 and curved adjacent thereto at 67 to form a chamber or duct curved substantially spherically about a point lying on or near the axis of rotation of the flaps 46 and 47. With such curvature, a substantial part of the slipstream of the rotor 35 is directed downwardly by this duct with only a nominal leakage or waste of air at takeoff and at landing. This part of the slipstream enters this duct in flow directed thereinto by the forward parts of the fuselage and is constrained by inertia to decelerate and thus increase in density. Such structure therefore provides a reaction on the under surface of the wing due to aerodynamic jump that will cause same to vary the direction of airflow relative to the wing to more than the actual curvature of the wing. The actual degree of turning is presently not ascertained because of turning of the slipstream as well as the relative rearward flow of same with respect to the wing. Theoretically it appears feasible that this degree of turning may exceed the built-in degree of turning (camber) approaching 90° as a limit at the speed of sound. While the specific structure disclosed is not adapted for operation at such speed, it is intended that this discovery be protected herein.

Figures 10, 11:
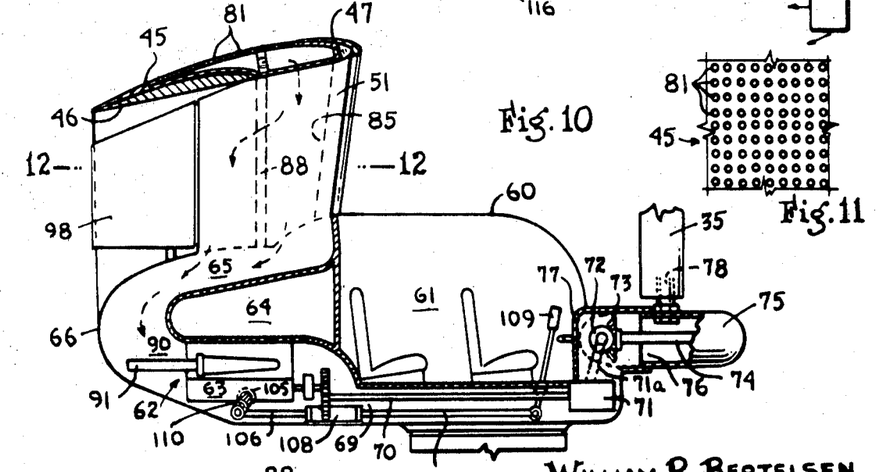
FIG. 10 is a half-sectional view adjacent the longitudinal centerline of the aircraft.
FIG. 11 is an enlarged detail of a wing surface.
Figure 12:
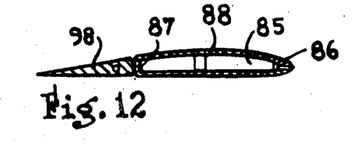
FIG. 12 is a section taken on the line 12–12, FIG. 10.
Figure 23:
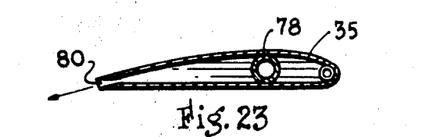
FIG. 23 is a section taken on line 23–23 of FIG. 9.

In the passenger compartment 61 controls (to be described below) may be placed adjacent either or both seats. A duct 69 is provided for housing a drive shaft 70, which shaft may connect to an angle gear and reduction box 71, which through suitable shafting 71a, or chain, turns a pinion 72 that drives a gear 73 connected to a shaft 74 that turns a pitch controller 75 connected with rotor blades 35. The pitch controller may be any of different well-known makes and is preferably of the constant speed type. These vary the pitch of the rotor blades 35 to automatically maintain a constant speed of rotation regardless of throttle setting. The duct 69 connects with the hollow interior 76 through a cowling 77. The rotor blades 35 are hollow and carried by a tube 78 that draws air out of the space 76 and thus through the duct 69. The tube may end at approximately the section line 23–23, FIG. 9, to cause the tube and interior of the rotor 35 to operate as a centrifugal pump. Air is discharged from the trailing edges and/or tips of the rotor blades in a downward and rearward direction to provide reaction thrust to the rotor 35 through expansion slots or holes 80, FIG. 23. It is preferred (though not in a restrictive sense) that a large mass of air be moved at relatively low energy for reasons to appear below.

Air supplied to the rotor 35 from the duct 69 is supplied, at least in substantial part, through small holes 81 in the upper surface of the wing. These may extend from approximately 30 percent to 70 percent of the chord of the wing 45. It is feasible to perforate the rotor 35 by similar holes 81, as well as the airfoil wings 36 and flaps 46 and 47. The holes are preferably about one thirty-second of an inch in diameter and spaced approximately 10 to the inch to provide 100 holes per square inch. Such sizing and spacing will provide approximately 10 square inches of effective opening per square foot of surface, and 14 square feet of surface will then provide about a square foot of opening. At an entrance velocity for each square foot of 200 feet per second 12,000 cubic feet of air per minute will be introduced into the wing 45, or approximately 1000 pounds of air at sea level. It is preferred that the interior of the wing 45 be shaped with openings to provide a smooth passage or duct for the air.

Figure 8:
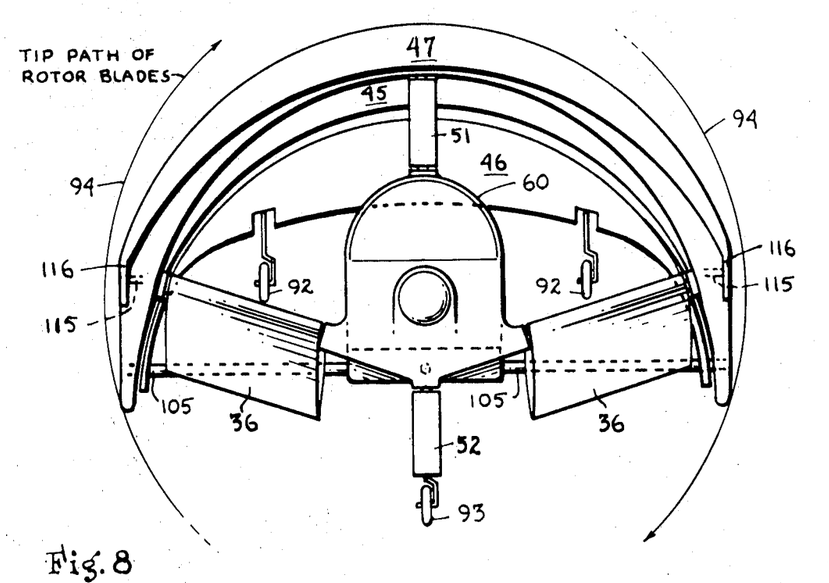
FIG. 8 is a front view of the aircraft as viewed in the direction of arrow 8, FIG. 7.
Figure 9:
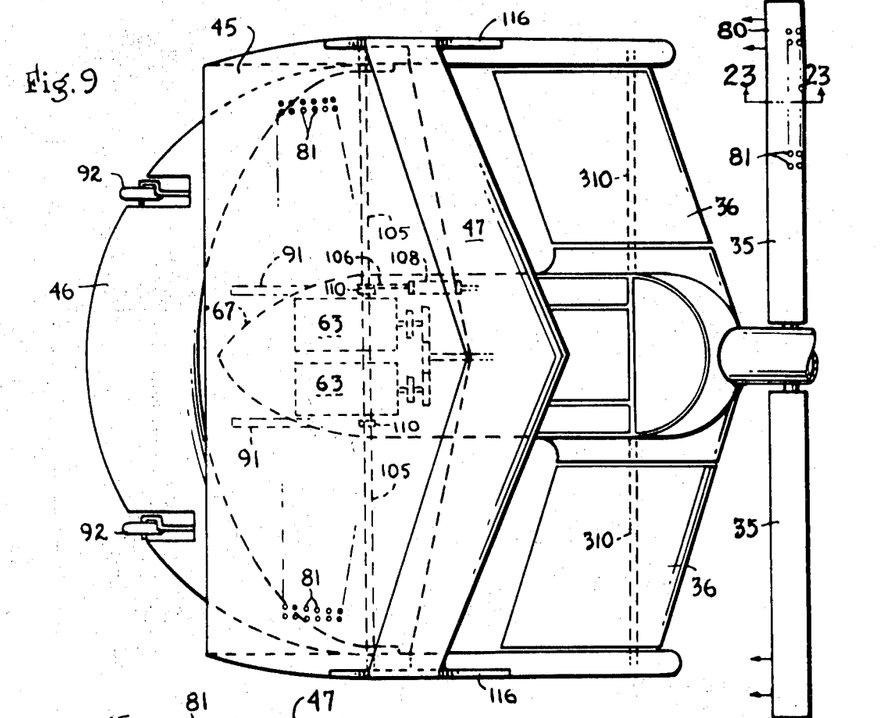
FIG. 9 is a top view thereof as viewed in the direction of arrow 9, FIG. 7.

The air drawn into the wing 45 directed to the stabilizer 51, FIGS. 8 and 10, which also serves as the securement of the wing 45 to the fuselage 60. The stabilizer 51 includes a cavity 85 and has solid front and rear struts 86 and 87 and a perforated center strut 88, FIG. 12. Airflow is in the direction of the arrows (FIG. 10) out of the wing 45 into the stabilizer 51 and into a passage 90 in the rear of the fuselage. The engines 63 are suitably ducted about their cylinders to receive air from the passage 90 for cooling the engine and raising the temperature of the air. The warm air passes into the duct 69 and thence to the rotor 35. The duct may be suitably shaped to provide heating surfaces in the portion 61 of the aircraft. It is also contemplated that exhaust gas from the engines 63 be entrained in this air to further elevate the energy level thereof. This could be done conveniently by reversing the exhaust stacks 91 to exhaust to the right into the duct 69 rather than to the left (as shown) to the rear of the craft. It is to be understood that air- and gasflow can be caused by a blower, to be described below in connection with another modification of the invention.

With the structure described thus far the following phenomena unique to this aircraft will obtain at takeoff and landing. Referring again to FIG. 7, the propeller, or rotor blades 35, may be in the solid line positions shown wherein they will clear the ground. Upon rotation, the slipstream of the blades 35 will be directed substantially downward so that upon an increase of engine power and blade pitch the nose of the aircraft will be rotated upwardly around retractable rear wheels 92, which, with a retractable nose wheel 93 carried by the rudder 52, support the aircraft at rest on the ground. The details of these wheels 92 and 93 are not of special significance except that they are all carried by control elements (the flap 46 for wheels 92 and the rudder 52) and the rear wheels 92 are moved by the flap 46 into ground engaging positions, whether or not they be retractable into the flap 46 and optionally into the wing 45 in suitable recesses, not shown.

With the nose of the aircraft elevated, the blades 35 can be rotated to the dotted line position by mechanism to be described more in detail below. The power to the blades 35, and the pitch thereof can be increased to maintain the nose up and to create a high energy slipstream behind the tip path 94 (FIG. 8) of the blades 35 (not shown in FIG. 8). This slipstream may follow an envelope approximately having an upper boundary 95, FIG. 7 and a similar circumferential boundary (not shown). Because of the presence of the fuselage 60 (which forms an inner surface for a partial duct when considered in combination with the wing 45 and flaps 46 and 47) the slipstream within the boundary 95 will be directed along a line 96 in substantial part. Because of the high degree of turning of the slipstream beneath the wing 45 and flaps 46 and 47 the slipstream will decelerate substantially to produce a relatively high air pressure on the bottom surfaces thereof. This high air pressure will cause a substantial part of the slipstream to rise approximately at the leading edges of the wing 45 and flaps 46 and 47 along lines 95, 96 and 97 respectively. This phenomenon of airflow is referred to as ground effect pressure rise and appears to provide a substantial increase in useful aerodynamic forces not available in present forward wing structures. More or less tilt of the path of the blades 35 from normal to the longitudinal axis of the aircraft will vary the effectiveness of the slipstream on the fuselage 60 and the wing combination including the flaps mentioned above.

The canard control surfaces 36 also serve to direct the slipstream. As they are rotated at their trailing edges upwardly above a mean chord line position normal to the tip path plane of the blades 35 the slipstream will be directed upwardly to increase the angle of incidence of the slipstream upon the fuselage and wing combination with consequent increase in lift. In so doing, the reaction force of the slipstream will cause a downward force upon the surfaces 36 to provide a pitch down moment at the nose of the aircraft. Conversely, downward deflection of the trailing edges control surfaces 36 from normal to the tip path plane of the rotor blades will decrease incidence of the slipstream on the fuselage and wing combination and provide a pitch up moment at the nose of the aircraft. Differential movement of right and left control surfaces 36 will so modify the inherent rotation of the slipstream to provide rolling control moments for the aircraft. This roll control, in combination with the rudder 52, will provide yaw control whether in hovering or translational movements of the aircraft.

It is to be noted that the control surfaces 36 and the rudder 52 are relatively close or adjacent the path of rotation of the blades 35. Such location provides a unique function particularly during takeoff and landing when maximum power is required by the blades 35. The counter torque of the blades 35, rotating clockwise as viewed in FIG. 8, will tend to cause the aircraft to rotate counterclockwise. However, the strong rotational wash of air in the slipstream will act upwardly on the left-hand control surface 36, downwardly on the right-hand control surface 36, and to the left on the rudder 52, all in the clockwise direction. Such action causes an inherent absorption of counter torque in apparently a substantially linear ratio to rotor horsepower absorption. Accordingly, the controls work effectively in substantially uniform manner regardless of power consumption, during hovering, forward, rearward, lateral, or vertical flight. In addition, rotation of the slipstream is reduced to a marked degree whereby the slipstream is stabilized to a certain extent prior to its engagement with the surfaces of the wing combination. To provide trim for the aircraft, and further stabilize the slipstream, a movable surface 98 is provided upon the stabilizer 51, FIG. 12. The stabilizer and surface 98 form an airfoil for completing a torque compensating couple about the aircraft centers of pressure and gravity together with the fuselage and the rudder 52. With such structure the control surfaces 36 may operate at high translational speeds at substantially minimum drag positions.

Figure 7:
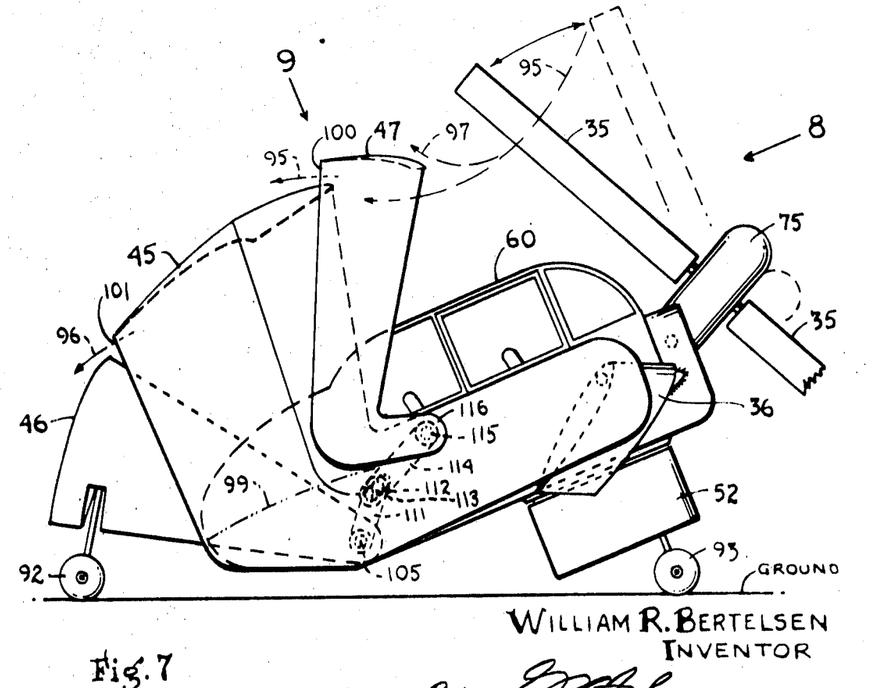
FIG. 7 is a side view of a form of the aircraft.

The aircraft body (or fuselage) 60 is shaped as a partial airfoil section as viewed in FIG. 7. The mean chord line 99 of the fuselage is shown at negative decalage with respect to the chord line (not shown) of the main wing 45. Such arrangement, although here presented not in a restrictive sense, contributes to preservation of slipstream energy above the tail of the fuselage and below the wing 45 and the flap 46, even though some high energy air is bled at high velocity over the flap 46 along the general line of flow 96. It is to be noted that the wing 45 has a positive angle of attack with respect to the fuselage. This angle may vary rather widely, and (as shown) is approximately 8°. Lower powered slow speed craft can use such structure most economically because of the relatively high angle of attack in horizontal flight. Higher powered, high speed, craft will best employ smaller angles of attack and low or zero decalage.

The combination of positive and negative pressure airstreams and areas (flow lines 95, 96, 97 and perforation 81) obtain a high degree of aerodynamic efficiency that is further augmented by one or more flaps 46 and 47, or the like, and the rotor slot 80 and perforations 81. The front airstream 97 provides for initial turning of the slipstream to a high angle of incidence. Stalling might result if the airstream 95 were not provided, which stream also has a high angle of incidence with the upper leading edge of the wing 45. However, the forming of a venturi slot 100 will induce high speed flow over the trailing edge of the flap 47 to prevent such stall over both the flap 47 and the wing 45. Due to the duct form of these wing portions, this venturi effect is very effective because the slipstream is constrained to a curved path of flow and thus high energy release. The perforations further augment the lift force and turn the airflow over the trailing edge of the main wing 45. A venturi slot 101, between the trailing edge of the main wing 45 and the leading edge of the flap 46 further augments the lift of the wing combination. It has been found that the venturi slots may vary substantially in position and spacing while still giving substantially useful effects. However, it is further found that the trailing edge of the leading wing section should be approximately above the leading edge of the trailing wing section by from 1 to 4 percent of the chord of the main wing 45, with substantially 2½ percent being the optimum position for maximum wing lift.

The above-described modification of the invention is preferred for small craft for one to four persons, for example. This craft is readily operated in a simple manner, as follows: The rotor may be constant speed and thus vary in pitch and hence thrust upon changes of the engine throttle. Vertical ascent and descent at zero air speed can thus be controlled by more or less throttle with the flap or flaps extended as shown in FIGS. 7—10. Lateral movements are controlled at this time by changing lift vector directions 32 (32a—32b) as described in connection with FIGS. 1—5, plus lateral control described in connection with FIG. 6. Such control function is obtained by a throttle and control surfaces 36 and rudder 52. For forward high speed flight the flaps can be retracted which automatically reduces drag of the wing combination to permit forward acceleration of the aircraft. It is contemplated that a first throttle setting may serve for takeoff and forward flight with the flaps being retracted at a predetermined speed by any of several known means, and a second throttle setting will cause settling to a landing after the flaps are extended at the termination of a given flight.

One mechanism for extending and retracting the flaps will be described below, it being understood that the specific mechanism can be replaced by several other known means within the scope of the present invention. For example, hydraulic devices, rather than mechanical devices will operate in substantially the same manner. Electrically operated means also can obtain the functions of hydraulic or mechanical devices.

It is to be noted that the flaps 46 and 47 are rotated about an area in which the center of gravity lies. This area exists preferably below the center of lift of the airfoil combination in order to effect stability regardless of the attitude of the aircraft with respect to gravity or centrifugal forces. The spacing of the centers of lift and gravity is preferably such that an harmonic oscillation will obtain at a rate of change greater than acceleration in any sense to provide inherent aerodynamic stability. Thus aerodynamic transients concomitant to phenomena inherently associated with the structure above disclosed, will be dynamically damped effectively. The concentration of wing forces, coupled with flap and wing slot augmentation, all converge about the center of gravity of the aircraft, and thus comprises an engineer-principle here best defined as the Bertelsen effect.

In conventional type aircraft the control surfaces are spaced one or more propeller diameters behind the propeller hub. Many craft have surfaces not in the slipstream at all. Such prior arrangements reduce the overall economy of slipstream dynamic control potential, inasmuch as the reduction thereof regarding space versus absolute parameters including the time rate of change of gas glow at or about atmospheric pressure (corrected for the actual pressure existing at sea level) may appreciably augment the effect of the wing combination as described above. It is to be noted that, because of the duct formation of the wing—fuselage combination, of the present invention, that lift coefficients of a very high order are obtainable.

To attain the Bertelsen effect noted above, it is preferred that a flap (or flaps) rotate about the center of gravity, or that the summation of flap resultant forces be combined in the vicinity of the center of gravity. Each flap may be considered in such regard as an entity, for simplicity. Many airfoil sections have a relatively stable center of pressure, that is, for different angles of attack the center of pressure travels only a small percentage of chord. The N.A.C.A. double 0 series is one such airfoil, for example NACA0012 has 12 percent thickness with respect to chord length and zero camber. Other cambered airfoils exhibit the same characteristics to a greater or lesser degree. It is within the scope of the present invention to use several of the presently proven airfoils to suit the purposes desired regarding lift and drag coefficients, and the double 0 series is mentioned only as one example. For slow speed craft comprising early experimental models, the basic Clark Y airfoil best suits because of extensive performance data. In addition, a Fowler type flap is shown for the same reason, it being known that a lift coefficient of substantially 3.15 is obtainable with a Clark Y main wing and a Fowler flap of approximately 30 percent of chord of the main wing. Other flaps of different types may well attain greater effectiveness, and it is a further object of the present invention to protect such structure by the scope of the appended claims.

The flap controlling structure to obtain the Bertelsen effect will now be described in sufficient detail to enable others skilled in the aircraft arts to build and use machines employing such effect:

In the modification described above, the wing combination including the main wing 45 and the flaps 46 and 47 are formed as viewed from the front or rear as an arc, or segment of a circle. Such arched structure is inherently strong while being light in weight, which feature comprises a further feature of the instant invention. Being arched, the flaps 46 and 47, and others if desired, are most conveniently rotated about an axis 105, FIG. 7, substantially across the diameter of the arc. Other positions may be used, however, the mechanism appears to be simpler at this position. In addition, especially in larger craft, hydraulic stroke motors, or electric motors with racks and pinions could be embedded in the wings, or used alternately, as desired. A rod 106, FIG. 10, can be moved directly by a control rod 107, or augmented by an hydraulic pressure motor 108 under the influence of a control lever 109 in the pilot's cockpit. As shown, rearward movement of the lever 109 will cause the flap 46 to rotate in a counterclockwise direction about the pivot 105 by rotation of a crank 110. For fully manually-operated control it is preferred that the shaft 106 carry a worm, the crank 110 be a gear segment, and the control 109 be a wheel to rotate the shaft 106.

The pivot 105 may be linked suitably to operate one or more flaps 47 as follows. An arm 111, FIG. 7, may be suitably secured to pivot 105, and said arm can carry a pin 112 which may move in a slot 113 in an arm 114 secured to a pivot 115 secured to an extension 116 of the forward flap 47. It is to be understood that one or more flaps could be thus actuated with similar or equivalent mechanical structure. It is to be noted that the flap 47 moves a lesser distance than the flaps 46 (about 50 percent) and the linkage 111 to 115 is of a reduction nature. Obviously, several different structures could obtain substantially the same end result. It is important to note that the lift force exerted by the flap 46 is directed substantially toward the pivot, and the lift force exerted by the flap 47 is also directed toward the pivot 105. The center of gravity of the entire aircraft may lie in an area substantially within broad limits around the pivot 105 to prevent pitching moments due to flap extension regardless of the kind of airfoil section employed in construction of the several flaps. The lift vector of the main wing 45, is also preferably directed in the same general area as the flap lift vectors. It is considered important that the centers of drag and thrust be above the uppermost parameter of the center of gravity, and preferably, although not necessarily, below the center of lift in order to provide a stable period of oscillation for the craft to prevent excessive transient oscillations.

The structure disclosed above is presented as requiring a minimum of structural material for the resultant function attained. The semicircular wing and flap structure forming the outside of a slipstream duct, and the curved upper surface of the fuselage forming the inside of a slipstream duct require what appears to be a minimum of structural parts. In addition, the flap mechanism can conveniently be adjusted to several positions other than the two positions shown (FIGS. 7—10) to attain a gross weight to speed of transport ratio permitting of carrying high "pay loads" at an economical fuel factor. It being understood that the above-described modification comprises a pilot design, only, and that the Bertelsen effect is applicable to larger craft, to be described below.

Figure 13:
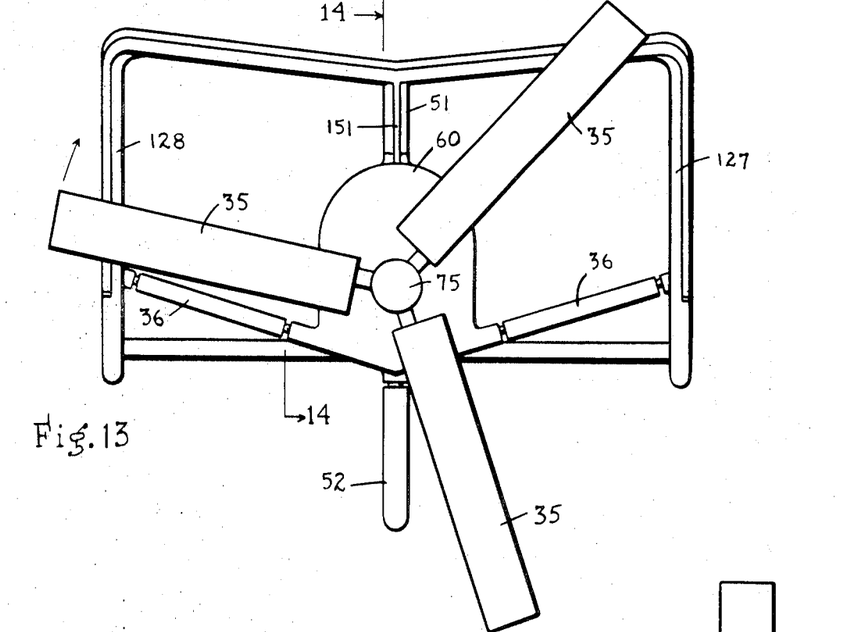
FIG. 13 is a front view of a modification of the invention, with the flaps up.
Figure 14:
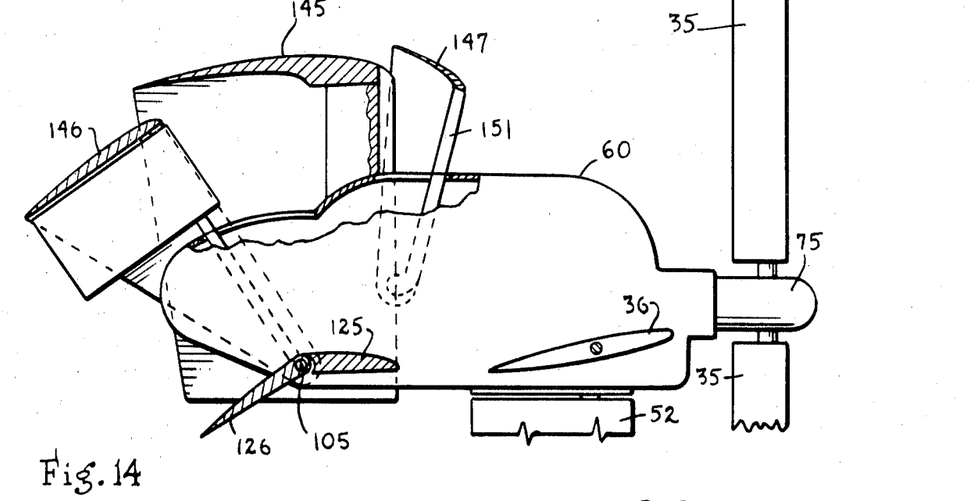
FIG. 14 is a sectional view taken generally on line 14–14, FIG. 13, but showing the flaps down.

Referring now to FIGS. 13 and 14, a modification of the invention is shown, which comprises several elements of the modification described above including the fuselage 60, the rotor blades 35, of which three are shown, rather than two as shown above, engine and drive means, canard controls 36 and 52 stabilizer 51 and suction and blowing lift augmentation, not here repeated. One of the principle differences in this modification resides in the utilization of constant chord length sections for the main wing forming combination. It is also convenient to provide dihedral angle in the main wing. Sweep-back, as well as dihedral angle, can be provided by the canard control members 36 as present in the first described modification. The instant modification is designed to absorb approximately 50 percent more horsepower than the first described modification in substantially the same manner. In addition, a lifting section 125 having a flap 126 carried on the pivot 105 and thus movable with the flap 146 is provided. Flaps 146 and 147 may be substantially identical to the flaps 46 and 47 described above in function, but differ by being of similar rib structure (constant chord, as does the main wing 145) for economy of initial manufacture. It is to be clearly understood that mass production of such aircraft may conveniently permit die-formed plastic or metal parts that can assume sundry forms for best economy of fabrication.

The lift surfaces 125 and 126 will augment the lift of the main wing 145, flaps 146 and 147, and canard surfaces 36 by a substantial percent. In addition, these surfaces 125 and 126, together with the fuselage 60 complete a duct bounded to right and left by fairing 127 and 128 into which the operating arms or elements for the flaps 146 and 147 may be nested quite conveniently. In this modification, the surface 126 will turn angularly to a degree equal to the rotation of the flap 146. This is mechanically obtained in a simple manner, and is effective to a marked degree aerodynamically. For even greater aerodynamic result a slight negative decalage may be used, and it is intended that the claims hereof be constructively considered accordingly. The net wing effect of this modification lies in a very favorable area, even though the interference losses due to the canard arrangement diminish the net wing force to some extent, not precisely ascertained. In other words, considered as a basic Clark Y airfoil, the main wing 145 will produce a lift coefficient at high angles of attack approaching 1.25. The Fowler flap 146 will, of itself, increase this coefficient to over three. The slot flap 147 will additionally augment this lift coefficient substantially because it functions aerodynamically in the highest lift producing area of the wing combination; and in addition provides a slot that functions with wing perforations (not shown in these FIGS.) to augment the total lift. Then, in addition, the plain flapped lift surfaces 125—126 provide torque compensation as well as additional lift to the aircraft. In VTOL this is very important because it is desirable, if not essential, that the total of vertical lift factors of the propeller-wing combination exceed the thrust of the propeller along. Thus exceeded, it then becomes increasingly useful as the wing lift factor exceeds the propeller lift factor to effect takeoff and landing of high pay loads. In other words, the wing structure functions best and most economically as an airflow energized lever. The present structure is such a lever as regards the utilization of rotor slipstream for control at low or zero relative airspeed, and the use of relative wind at translational speed.

It is contemplated that the principles above set forth will be utilized in high speed heavy aircraft. Accordingly, attention is directed to FIGS. 15 and 16 wherein a double rotor machine is disclosed diagrammatically, it being understood that elements disclosed in the above modifications may serve, in principle, to effect fabrication of same. As above, the views are not on the same scale. However, the slipstreams 195 from the rotor blades, not shown, bathe the wing members, to be described, substantially in their entirety. The craft is especially designed for high lift and may employ power in thousands of horsepower. In the event of use of such high horsepower, it is preferred that the solidity of the rotor be increased as by adding more or broader blades 35 in prime numbers such as 3, 5, 7, 11, for example. Thus, until the spacing approaches substantially one chord length of space between blades, the interference factor and the sympathetic or induced harmonics of vibration are kept within tolerable limits; it being understood that it is preferred that the tip speed of all rotors be kept within that of present helicopter practice (300 feet per second, for example, or less) for maximum aerodynamic economy.

Figure 15:
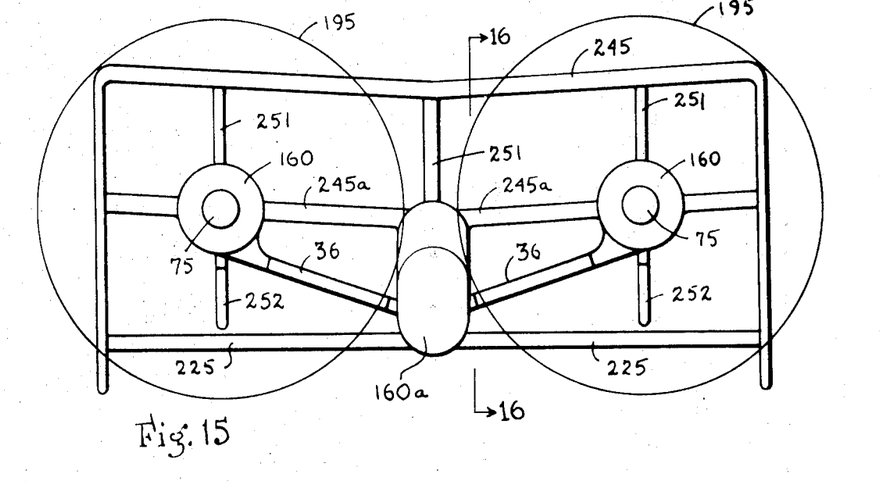
FIG. 15 and FIG. 16 are of a modification and are taken similarly to FIGS. 13 and 14.
Figure 16:
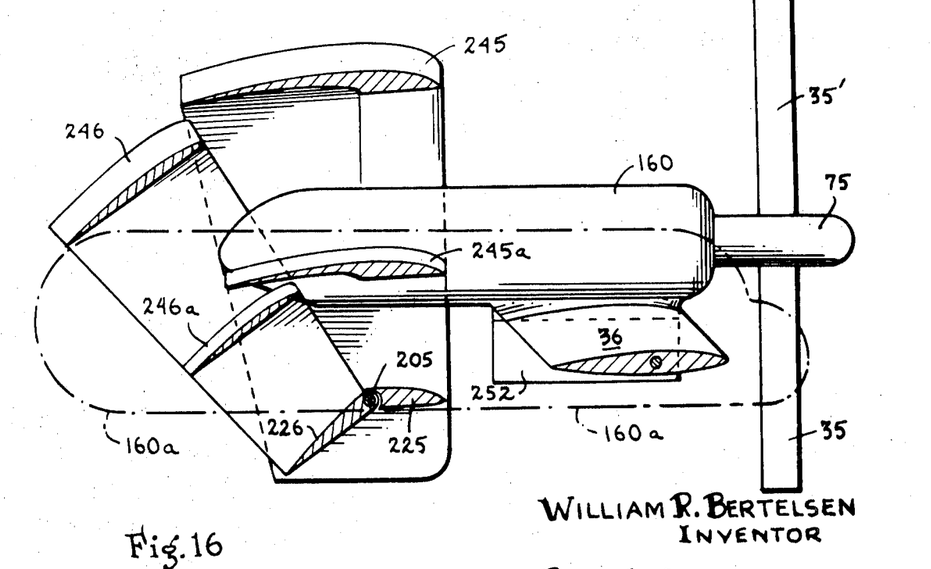

The structure shown in FIGS. 15—16 has a main fuselage 160a for containing controls, passengers, cargo, or the like, and subfuselages 160 that may be fabricated quite like the fuselages 60 or the above described modifications, except that their prime function in the present form is to house engines, fuel, cargo, and passengers only in larger models. It is to be understood that four, or six, or more, rotor mechanisms could be fabricated within the scope of the instant teachings. Although not shown, the slipstreams 195 (whether two, four, or more) can be rotated to lift the nose of the craft as described in connection with FIGS. 7—10. Each subfuselage 160 is provided with a stabilizer 251 and rudder 252 for control purposes. Control surfaces 36, 252, and wings 246, 246a, and 225—226, all rotatable about the pivot 205 will provide control and lift for the structure. The rotors, not shown in FIG. 15, forming the slipstreams 195 may rotate in opposite directions in this form of the invention so that torque compensation is no problem. Each rotor may be energized by two engines so that power failure of any one engine will not present a hazard to landing safely, as presented in connection with the first modification disclosed. The total lift of the present structure is also near the center of gravity thereof to utilize the Bertelsen effect advantageously. No forward flaps are shown, although such may be desirable for maximum lift for a given aircraft.

It is to be noted further that the lifting surfaces of the fuselage members 160 and 160a contribute duct portions in combination with wing elements, or surfaces, 245, 245a, 246, 246a, 225, 226 and 36. As viewed in FIGS. 15 and 16, substantially the entire slipstream is entrained into engagement with these elements, or surfaces, to attain an optimum of aerodynamic reaction in this structure. A substantial ground effect pressure rise that tends to spread (or bathe) the wing and control surfaces will obtain. The Bertelsen effect enhances this phenomenon because no negative control forces, such as downward slipstream deflection by surfaces 36, need be employed to attain proper lift attitude for the craft. The fuselage 160 can be extended within any desired limits so long as the flaps 246 clear same to accommodate high pay loads. The structure has inherent static and flight stability in keeping with the above modifications when the centers of lift and gravity are maintained in the area described above.

The overall structure; flap operation, and operating parameters have been described in some detail above. Control means for attaining a desired exemplary mode of operation will now be set forth. It is herein to be understood that automatic means, as well as electrical hydraulic, pneumatic, manual, or a combination of any or all of such means reside within the present inventive concept.

Figure 17:
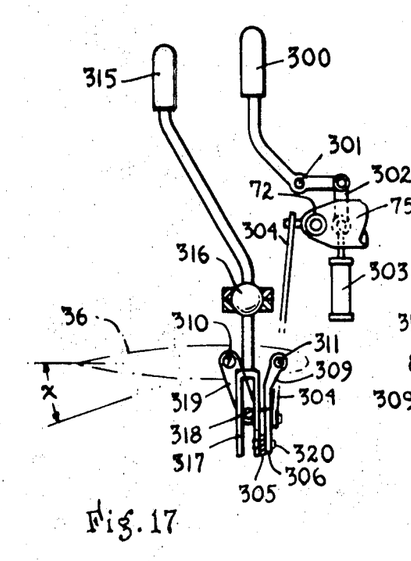
FIGS. 17 and 18 are sectional and front views respectively of pitch and roll controls.
Figure 18:
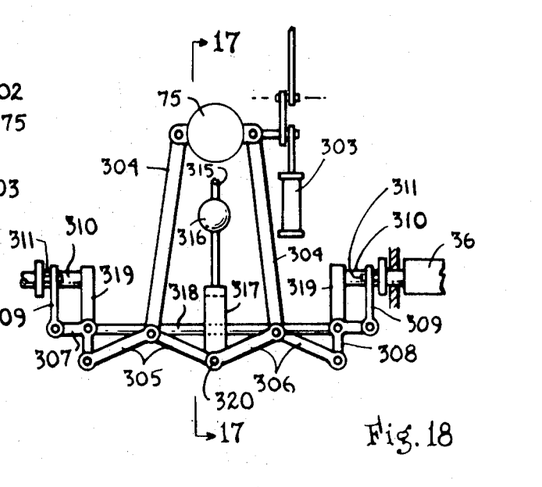

Referring first to FIGS. 17 and 18, the roll and pitch controls are shown in diagrammatic form, in addition to the controls for the path of the rotor blades that also may control pitch. This latter structure will be described first. A hand operated lever 300 turns about a pivot 301 to raise a control link 302, which in turn can cause a servomotor 303 to move the rotor hub 75 about the gear 72 (FIG. 10). Such rotation will cause a downward movement of links 304 and hence straightening of toggle linkages 305 and 306. Bell cranks 307 and 308 will be rotated clockwise and counterclockwise respectively to raise links 309. Because these links 309 are located forward of the main control pivots 310 upon pins 311, or the like, the canard surfaces 36 will be raised through some angle $x$ substantially equivalent to the angle of movement away from normal of the plane of rotation of the rotor blades 35. Of course, this may be modified as desired for different craft having different weight distribution longitudinally.

With the above structure, no matter what the position due to rotor tilt, the following pitch and roll control functions obtain. A stick 315 can be moved in all senses about a ball mount 316. As viewed in FIG. 17, right-hand movements of the stick 315 will cause clockwise rotation of a fork 317, a rod 318 therebetween, and thus cranks 319 connected with control pivots 310 for the surfaces 36. Thus a pitch down moment for the nose of the aircraft will be provided. Left-hand movement of the stick 315 will cause pitch up moments for same. Thus, it is seen that pitching moments can be provided by a plurality of the means and manual control may effect the master control.

Roll control obtains as follows: Referring now to FIG. 18, right-hand movement of the stick 315 will cause left-hand (clockwise) movement of a pivot 320. Such movement, through the toggles 305 and 306 will cause clockwise rotation of the bellcranks 307 and 308. Thus, through linkage above described, the right airfoil 36 will be lowered in angle of attack and the left airfoil will be raised in angle of attack. Conversely, the opposite roll will be obtained for left-hand movement of the stick 315. Obviously, the stick motions do not follow simple fore and aft, right and left, movements, but are a combination in all degrees of azimuth. Hence, the one example of function is presented only illustratively.

Figures 19, 20:
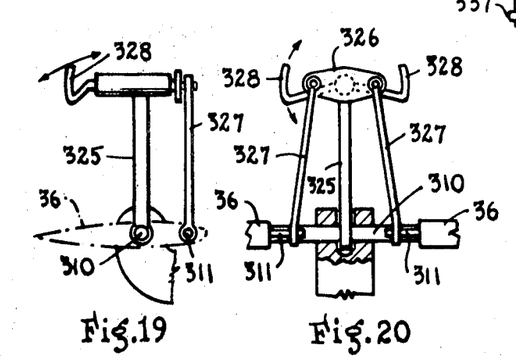
FIGS. 19 and 20 are taken similarly to FIGS. 17 and 18, but show a modification.

FIGS. 19 and 20 illustrate a less complicated control than that disclosed above, which control is particularly useful in smaller craft, wherein the rotor need not be tilted for ground clearance; as well as large craft wherein ample ground clearance is available. This modification, as well as others, may be servopower augmented in known manner, as desired. For example, structure such as presently employed in "power steering" in automobiles affords a relatively inexpensive mechanism that is easily adapted to servomechanisms of capacity sufficient for use in light air frames. Of course, heavier air frames may need larger capacity systems; and it is considered that such reside within the scope hereof.

The specific basic control consists of a bar 325 fixed to the control spar 310, and a crank 326 connected by links 327 with pins 311 that control pitch of surfaces 36. Handle bars 328 may be pushed or pulled fore and aft for pitch control, or rotated (FIG. 20) for roll control, as follows:

Fore and aft movements (FIG. 19) obviously reduce or raise the angle of attack of both airfoils 36 together. Clockwise or counterclockwise rotation (FIG. 20) lower the right airfoil 36 on clockwise movement or raise the right airfoil on counterclockwise movement, to effect roll control. Again, it is to be noted that each of these aspects of control is modified by the other, and in addition by yaw control means, now to be described.

Figure 21:
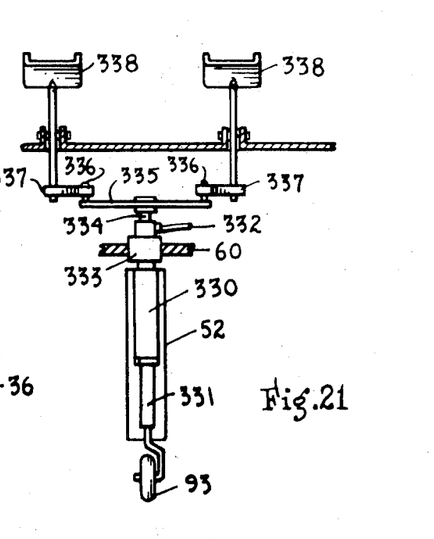
FIG. 21 is a front view of yaw controls.
Figure 22:
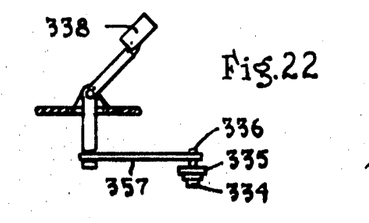
FIG. 22 is a side view of yaw controls.

Referring to FIGS. 21 and 22, the yaw control mechanism is shown. It is of importance that with high dihedral angle of surfaces 36 it is feasible to combine this function therewith. However, in order to disclose a complete structure, independent of composite limitations, it is considered, nonrestrictively, appropriate to exemplify independent means for controlling the third major moment present in aircraft (the three translational moments, rise, forward, and lateral, being necessarily concomitant functions of pitch, roll, and yaw;) and pitch, roll, and yaw comprising essential hovering states.

The rudder 52 may be hollow to the extend of receiving and fairing the forward wheel 93 through the function of a retraction hydraulic mechanism 330 containing a conventional shock strut 331. An hydraulic supply pipe 332 may provide the medium for controlling same. The entire structure is preferably pivotally carried in a bearing 333 in the bottom of the fuselage 60. A shaft 334 for moving the rudder 52 is connected to an arm 335 having pins 336 secured to links 337, in turn pivotally connected to pedals 338 in the manner shown, for example. In the example, pressure on the right-hand pedal (FIG. 21) will cause right heading change of the aircraft. For the opposite effect, if desired, the linkage could conveniently be crossed.

Referring now to FIGS. 24 through 29, the operation of craft built in accordance with the present invention will be described. Again, it is to be noted that several modes of operation are possible in such craft because of the Bertelsen effect, with cascade flaps, ducted slipstream, hydraulic jump, availability of different solidities of rotors, canard control, and fuselage effect, all within the teachings hereof, and mechanical equivalents; and hence, only an example based upon flight of a small model will be described in some detail. Because of axes of control of the canard surfaces 36, and the rudder 52, all of which may be of NACA double 0 series lie generally at about 23.8 percent of chord, as nearly as possible, these surfaces can be controlled directly by manually operated structure. Of course, mechanical assistance means can be used, if desired, or required, for different sections, or larger aircraft.

As regards the three prime modes of control (yaw, pitch, and roll) it may, at first observance, appear that the Bertelsen effect is not primarily efficacious. However, this is not the actual status, for the following reasons:

The control canard surfaces 36 and 52 can exert forces upon the aircraft up to a maximum effectiveness determined by air slipstream energy only. Such level of energy is inherent in the structural combination of the aircraft. It appears that the most energy is available when the canard controls 36 and 52 are immediately behind the rotor blades 35. Within practical limits, it appears that this spacing may be as much as one half to 1½ rotor diameters, while still accomplishing as appreciable aerodynamic function. This is not set forth in a limiting sense, because it follows that, extremely large spacings may have some useful effect. In fact, the main wing combination (formed as a scoop) appears to substantially deenergize an air stream effectively even though placed several propeller diameters to the rear of same. In other words, it appears that a confined, or entrapped, airstream can deliver substantially more energy (power) than appreciated heretofore. Indeed, the Bertelsen effect in a ducted wing indicates coefficients of lift substantially in excess of those previously obtained. Accurate measurements are not now readily available due to the novel character of the presently disclosed aircraft; however, indications point to lift coefficients exceeding those of helicopters, or the like. It is further to be noted in connection with the present disclosure that the tip speed of the rotor blades be kept at an economically low value. Inasmuch as one normal attitude for at least one of the disclosed craft is such that the rotor operates at substantially 45° with respect to gravity, it is considered now that the tip speed of the blades should not be such that energy is exhausted unproductively. Hence, a tip speed of 300 feet per second is selected as an arbitrary mean. At such speed, at a suitable angle of attack (or incidence) the rotor will use fuel in the engine at a rate that can be best adapted to the desire of the individual using same. It is to be noted that at an impartation of half the speed of 300 feet per second velocity that substantially only one-fourth of the horsepower is required. In other words, if 200 horsepower is required to accelerate the air stream to a velocity of 300 feet per second, it will only require approximately 50 horsepower to accelerate the airstream to 150 feet per second.

In view of the above, and noting the fact that the flaps 46 and 47, and the Bertelsen effect which maintains substantially a constant relationship of centers of pressure and gravity about which the craft will rotate in yaw, pitch, and roll, and thus does not adversely affect the functions of of control surfaces 36 and the rudder 52, a controllable aircraft combination is available. In addition to this basic presentation, an aircraft is presented that can not only operate VTOL, but can fly between points at high speed.

Figure 24:
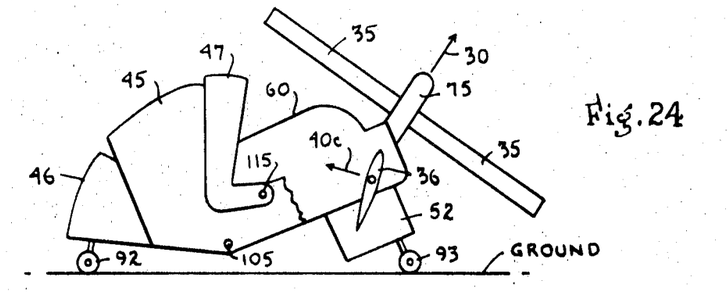
FIGS. 24 through 29 are diagrammatic views showing different stages of flight.

Referring now to FIGS. 24—29, and first to FIG. 24, the aircraft 60 is at rest on the ground upon its wheels 92 and 93. The rotor 35 is tilted by the hub 75 and rotated at a relatively low angle of attack, or speed, to cause the thrust 30 to raise the nose of the craft about the rear wheels 92. The force required is not large in this maneuver because a substantial portion of the weight of the craft is carried by the rear wheels 92. It is desirable that sufficient propeller wash be provided to create a control force 40c on airfoils 36 so that the craft may be safely maneuvered even with an appreciable ground wind. Brakes, not shown, of any conventional form may be applied to wheels 92 to also control at takeoff and landing. The flap 46 is extended about the pivot 105, and the flap 47 is extended about the pivot 115. The effects of the wing combination and the rudder 52 is not great in this position.

Figure 25:
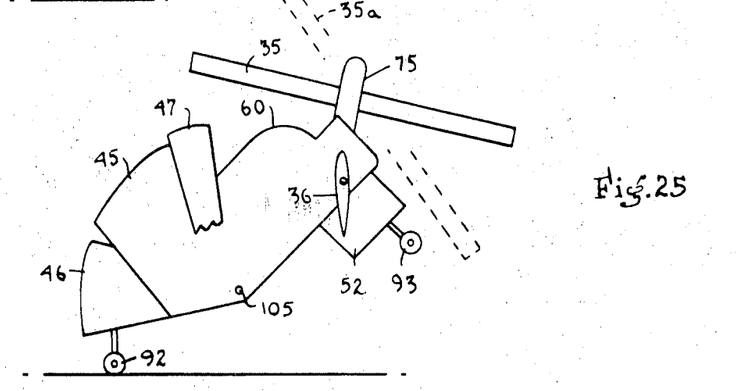
Figure 26:
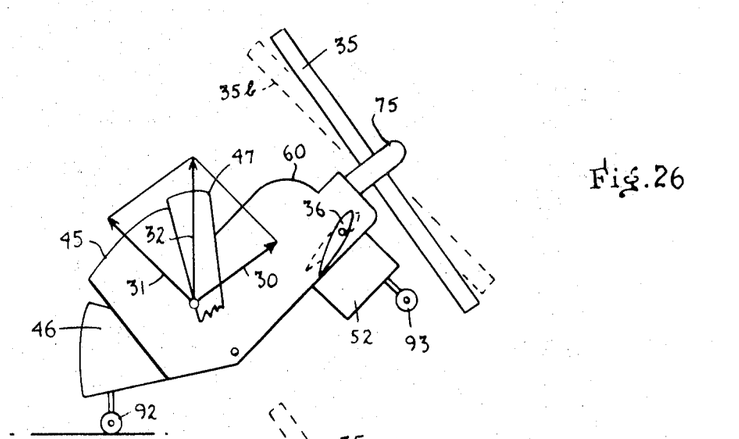
Figure 27:
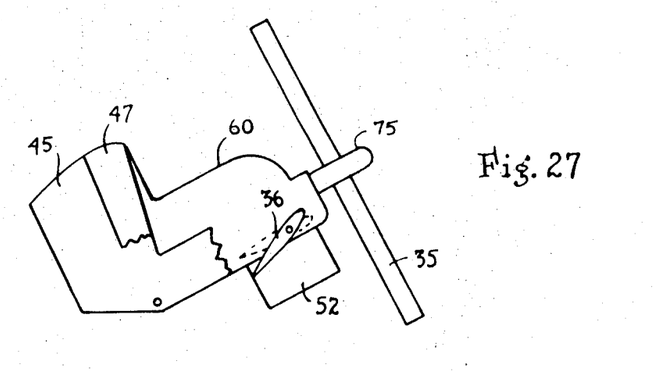
Figure 28:
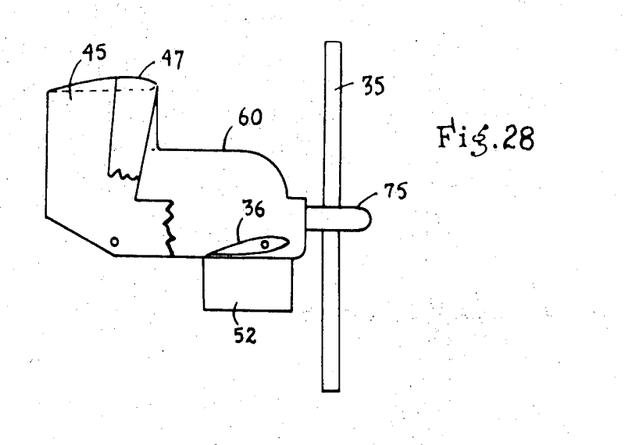

From the positions of FIG. 24, the craft is rotated about the wheels 92 into the position shown in FIG. 25. In this second position, the rotor 35 is rotated from the solid line position to the dotted line position 35a. The control airfoil 36 may be rotated simultaneously to retain lift for the nose of the craft, and the slipstream will activate the wing combination 45, 46, and 47 so that some designs may not require a different throttle setting during this maneuver. Of course, other craft may require more or less throttle at this time. The craft can be taxied in this position by releasing brakes on the wheels 92, and in such operation the rudder 52 will control heading. For high load, takeoff can be attained from this altitude with a short run to augment the effect of the slipstream of the blades 35.

For vertical takeoff, brakes may remain on to stabilize the craft and the power and pitch of the blades 35 increased. The components of rotor thrust 30 and wing lift 31 will combine in the resultant 32 to overcome gravity and cause the craft to rise in the direction of the resultant 32 to overcome gravity and cause the craft to rise in the direction of the resultant 32. The canard control surfaces 36 and 52 control the yaw, pitch, and roll moments. The rotor blades 35 can be tilted to their normal flight path 35b after some vertical acceleration is obtained to gain altitude at a reasonably rapid rate of climb.

At a desired minimum altitude the flaps 46 and 47 may be drawn into faired relationship with the main wing at a rate to provide forward acceleration of the craft. The engine power can be reduced as airspeed is attained, and control airfoils 36 manipulated to bring the attitude of the craft to that shown in FIG. 28. In such position only a minimum of drag is desired to most economically provide high translational speed. The rotor blades may be changed in pitch to control this speed, and the engine adjusted accordingly. It is to be noted that the landing wheels are retracted in FIGS. 27 and 28 to further minimize parasite drag. As a destination is approached, the engine power may be reduced to decelerate the craft and thus lose altitude.

When a safe minimum altitude is obtained, the flaps 46 and 47, wheels 92 and 93 are lowered, and the throttle setting placed to a settling position. The nose of the craft is raised by control ailerons 36 and the craft brought down at substantially zero relative ground speed progressively through altitudes shown in FIGS. 26, 25, and 24 at rest. It is to be understood that different craft may exhibit different altitudes due to greater lift forces of multiple wings, or a larger wing, or the like.

In the event of dead engines as by failure of fuel supply, or breakage, or the like, the craft may be landed either by a high speed glide with nose down and flaps 46 and 47 more or less extended. Because of the Bertelsen effect, this speed need not be great because of slotted wing phenomena. Thus with the nose lowered from the position shown in FIG. 28, the flaps may be partially extended to lengthen the glide path to a desired extent, and opened completely together with upward deflection of control surfaces 36 to raise the nose to provide a tail down landing at the time of touchdown of the wheels 92. It is to be noted, that a ground effect will "soften" the landing force substantially when the craft is a few feet above the ground. Because the engines are to the rear of and below the occupants, complete destruction of the craft can occur at such low forward speed without serious injury to the occupants.

Figure 29:
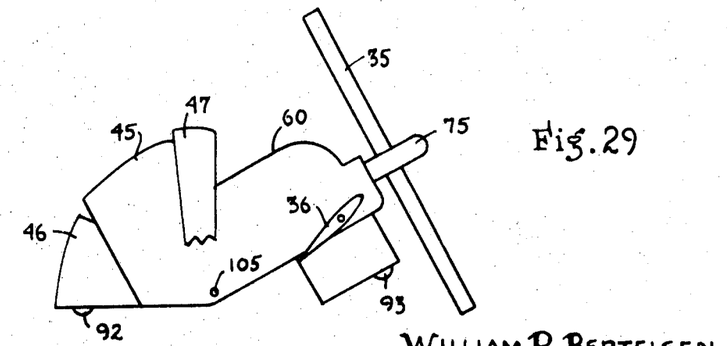

In the event of complete power failure with the craft settling through attitudes 29 through 24, provision, not shown, may be made for instantly reducing the pitch of the rotor blades so that they may autorotate due to the reversal of relative flow through the blades. Again, in such case, because of the concentration of weight below and behind the occupants, the likelihood of serious injury is reduced substantially. These are further objects and advantages of the present invention.

Figures 30, 31:
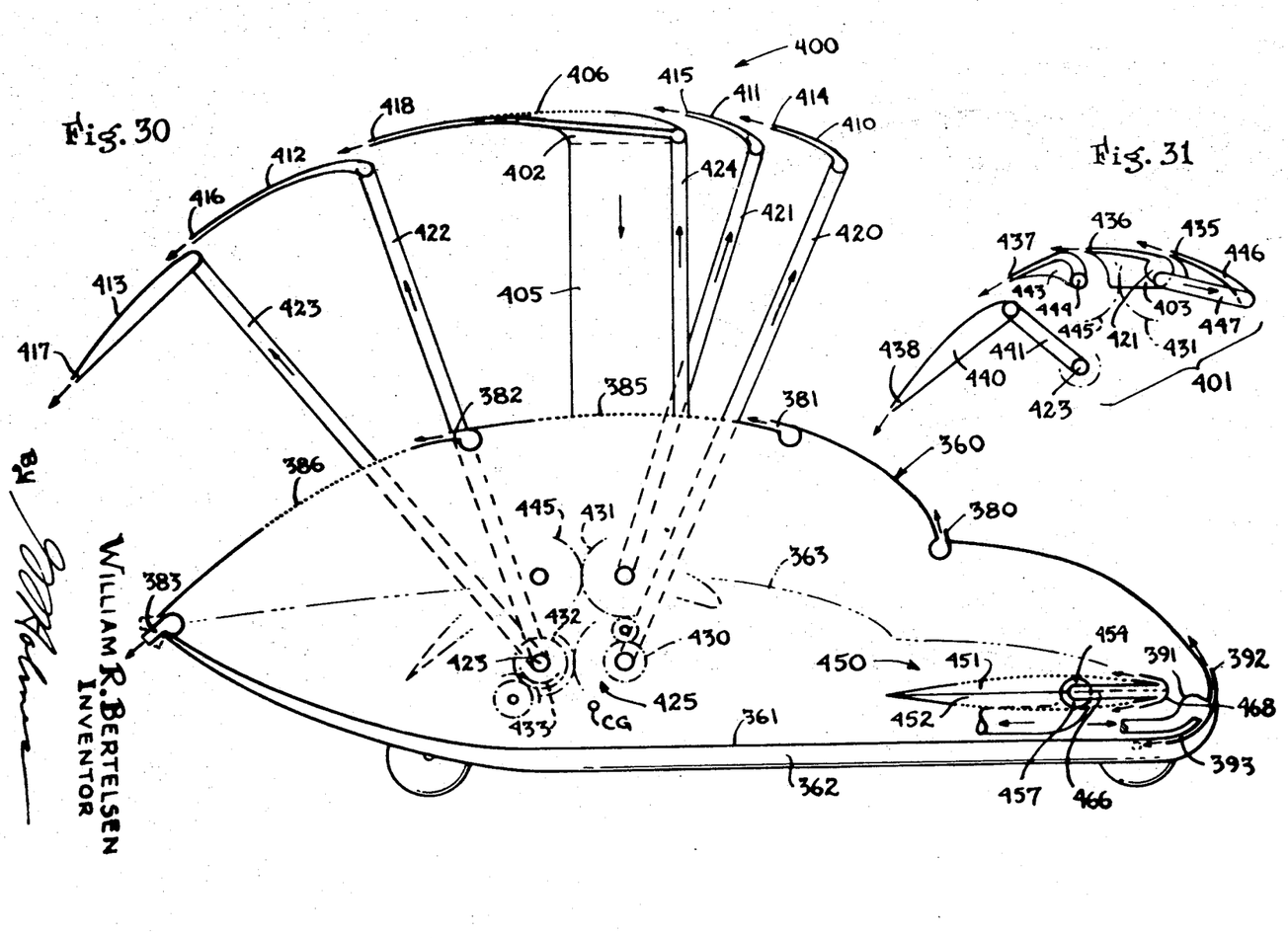
FIG. 30 is a semidiagrammatic view of a reaction propelled modification of my invention.
FIG. 31 is a diagrammatic view of a lower wing of the modification shown in FIG. 30.
Figure 32:
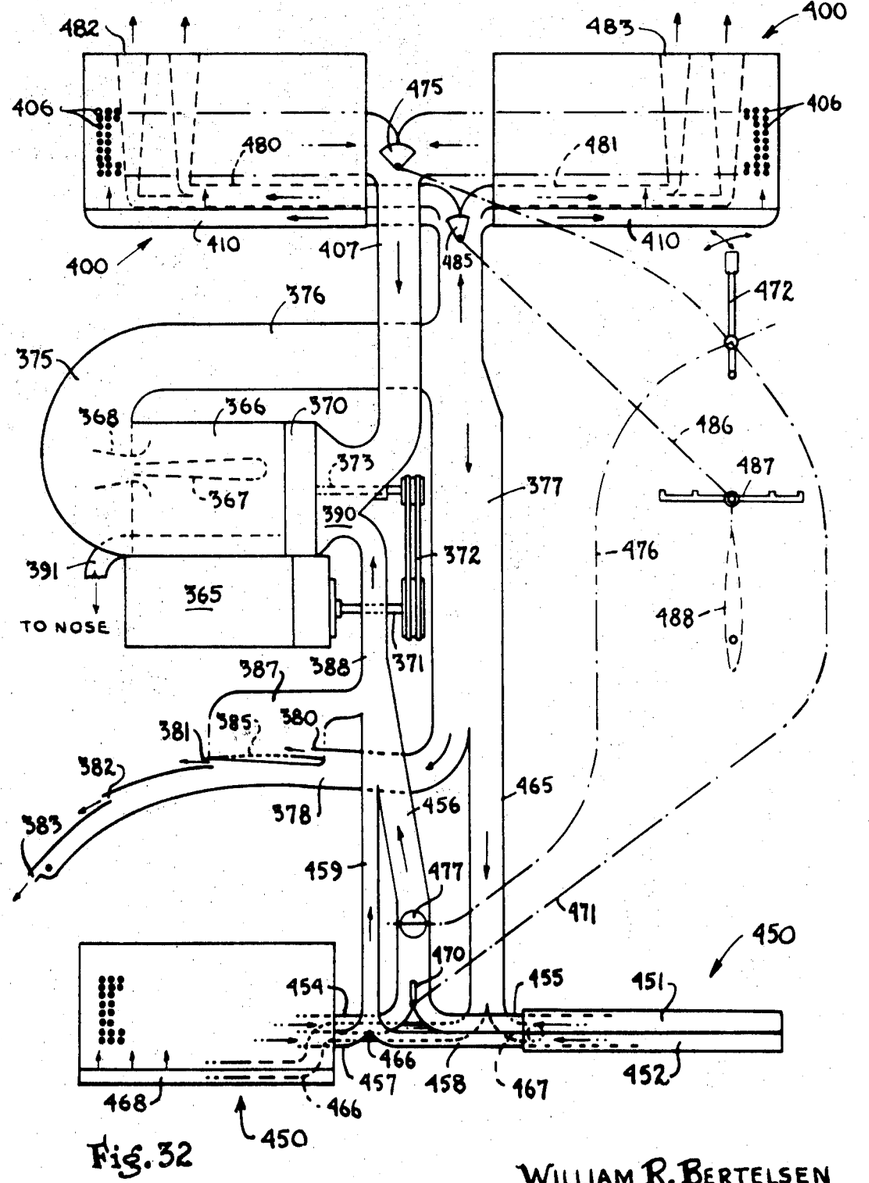
FIG. 32 is a diagrammatic view of a control system for the modification shown in FIG. 30.

Referring now to FIGS. 30, 31, and 32, a rotorless modification of the invention is shown. In its broad aspects this modification comprises aircraft propelled by jets or ejectors that are conveniently adapted to move more or less air as required at a ratio of relatively high mass to velocity ratio. Expressed, differently it is contemplated that a given quantity of air may be moved at given velocity to provide a predetermined unit of energy that may vary as a linear function of the mass, times a nonlinear function of the velocity, times a suitable constant that may be ascertained by wind tunnel and flight test for a given fuselage and/or wing, as these may be modified by fairing, interference factors, decalage for wing or wings and fuselage, etc. It is further an object in connection with this combination to induce a high speed flow of air by local and cascaded jets and slots combinations to create a plurality of high energy stations on lifting surfaces, and further in addition controlling the yaw, pitch, and roll moments by differential blowing of air, or exhaust gases, or both over boundary layer control surfaces that may be fixed or movable to best suit all attitudes of the craft.

Referring to the diagrammatic views 30—32, a fuselage outline 360 has a floor 361 that may be transversely curved inwardly and upwardly toward the longitudinal axis of the body 360 to form an upper wall 362 of a partial duct. The upper surface of the body 360 is preferably curved about the mean camber line 363 to form the body as at least a partial airfoil as disclosed in the above modifications. An engine 365 has the cylinders within a duct 366 which supplies engine cooling air as well as air for combustion. Exhaust gases from the engine are drawn out of a stack 367 by a Venturi device in the airstream from a blower 370 turned by the engine 365 through suitable gearing 371, 372, and 373, shown as a belt drive, for example. The blower 370 is preferably one which moves a large mass of air at relatively low velocity and static pressure for economy of operation. A few pounds of air pressure 5 for one example) are deemed sufficient to provide dense air engine cooling, take up duct friction losses while still leaving sufficient pressure for aerodynamic lift and thrust purposes, to be described below.

As shown, mixed air and exhaust gas are combined in a plenum chamber that may be comprised of structural parts of the body 360 for economy and weight saving. Preferably, though not shown, all ducts are round for economy in this regard, with smooth turns for low turbulence loss. The exhaust engine gas need not be mixed with the air if not desired, but can be exhausted through some of the jets described separately from the air so as not to contaminate same where some fresh air is used for heating, pressurizing, deicing, or the like, in the passenger portions of the craft.

Air under pressure in the plenum 375 is directed through a main duct 376, and ducts 377 and 378 to a plurality of jets 380, 381, 382 and 383, the latter one of which may be adjustable (FIG. 30) to effect control, or trim. These jets 380—383 direct air over the upper surface of the body 360 to obtain a lift force due to curvature thereof. In addition, the surfaces of the body may be perforated similarly to the above described modifications to augment this lift force. Air is drawn into the portion 385 (386 not being shown in FIG. 32) into a suction duct connecting to a duct 388 leading to a plenum 390 on the suction side of the blower 370. A duct 391 leads from the blower 370 to a pair of nose jets 392 and 393 blowing over the upper and lower surfaces of the body 360. The spacing of the upper jets 392, 380, 381, 382, 383 and the suction areas 385 and 386 is such that high velocity air (preferably 100 hundred or more feet per second) bathes the entire upper surface of the body 360. Thus, with a light craft, only the body is required to lift and sustain the craft in substantially the attitude shown. With a short takeoff run into the wind it appears possible to attain an effective airspeed substantially in excess of this speed as upper surface wing pressure is reduced by relative speed.

To elevate high payloads the same general principles are applied to wing combinations 400 and 401 that may be extended, as shown, or contracted into faired single wing sections consisting of relatively stationary parts 402 and 403 respectively. The upper parasol cascaded jet wing will first be described. The main upper wing 402 is carried by one or more hollow struts 405 through which air is drawn through holes 406 in the upper wing surface through a duct 407 into the suction side of the blower 370. Flaps 410, 411, 412, and 413 have jets 414, 415, 416 and 417, and the wing 402 has a jet 418, which jets are fed with air under pressure through pipes 420, 421, 422, 423, and 424 respectively to provide jet blowing as described above in connection with the fuselage. Because they are movable about adjustment gearing 425, the flap pipes 420, 421, 422 and 423 are conveniently connected through hubs of gears 430, 431, 432, and 433 respectively which gears also are in train to move the flaps in proper senses as well as distances, in conventional manner in machine gears.

The lower wing 401 also contains jets 435, 436, 437, and 438, the jet 436 being in the fixed wing portion 403. A trailing wing portion 440 is carried by a tube 441 mounted on the hub of the pipe 423 to receive hot gas therefrom to be exhausted through the jet slot 438 (FIG. 31). A wing portion 443 is mounted for rotation upon a pipe 444 connected with a gear 445, or the like, meshing with the gear 431 to rotate the jet 437. A forward wing portion 446 is carried by a pipe 421 for receiving hot gas therefrom to exhaust through the jet slot 435.

The wings 400 and 401 are adapted to be extended for takeoff and landing, and for flight are retracted to form low drag airfoil sections. The lines of wing lift of the several portions of the wings 400 and 401 converge in the area of the center of gravity of the aircraft forming combination which may lie substantially between and below the gears 430 and 432. Thus, the Bertelsen effect is obtained in this modification also. Hence, the control effectiveness of control surfaces 450, and the perforations 406 in the upper wings 400 is quite pronounced, and small control effort is required in senses to be described below.

The forward wings 450 are divided into upper and lower chambers 451 and 452 respectively and connected to branch pipes 454 and 455 from the upper chambers to a suction duct 456 connected with the duct 388. The lower chambers 452 are connected by pipes 457 and 458 to a smaller pipe 459 connected to the pipe 456 and thus, the suction pipe 388. The right wing 450 (FIG. 32) is rotated 90 degrees into an unusual position only for the purpose of clearly showing this piping arrangement. These wings may be fixed or movable in practice and blowing and suction effects used to augment the lift of the wings 450 differentially or simultaneously to control roll and pitching moments. As will appear below differential control of main wings 400 with respect to the control wings 450 will affect some yaw control. Of course, movable canard airfoils may also be used to conveniently augment the control of these attitudes during flight, if desired.

Air under pressure is fed to the wings at all times during operation from pressure duct or pipe 377 through a pipe 465 having branches 466 and 467 to the left- and right-hand wings 450. These branches feed a leading edge chamber 468 (only one shown) on both wings 450 to direct jets over the upper and lower perforated surfaces of the control wings 450 at sufficient velocity to provide controllable lift vectors. A valve 470 connected by a flexible control shaft 471 connected to a stick 472 may be rotated to the right or left. Left movements will decrease the suction on the left upper wing 450 surface, while increasing suction out of the chamber 451 connected to the upper surface of the right wing 450. Right movements of the valve 470 will reverse this suction action. More suction on an upper wing surface will increase the lift thereof and conversely less suction will decrease the lift thereof. Thus, differential suction caused by movement of the stick 472 to right and left will cause roll movements of the aircraft. The stick 472 also connects with a valve 475 to cause similar differential suction of the main wings 400 in the same manner.

Pitch control may be controlled by the stick 472 through a shaft 476 connected to a valve 477 in the pipe 456. Fore and aft movements of the stick 472 may close or open respectively the valve 477. As this valve 477 is closed less suction will be obtained in both upper surfaces of the wings 450 to cause nose down by the constant suction on the lower surfaces thereof through pipes 457 and 458 connected to the pipe 459. As the valve 477 is opened more suction on the upper surfaces of the wings 450 will cause nose up for the craft. Because the relative amount of air drawn into the wings 400 will remain constant during changes on wings 450 this control action will be quite sensitive about the center of gravity of the craft.

Yaw control by differential blowing through pipes 480 and 481 connected to driving jets 482 and 483 in the left and right main wings 400 respectively, these jets 482 and 483 may be made up conveniently of one or more of jets 416, 417, and 418 (FIG. 30). A valve 485 is connected by a shaft 486 to a rudder bar or wheel 487, which may also rotate a rudder 488, as desired. Left movements of the valve 485 will shut off gas flow to jets 482 and increase the flow to the jets 483. Right movements will supply more gas to the jets 482 and less to the jets 483. Thus, more or less force for controlling yawing moments is available in convenient form about a perpendicular line substantially through the center of gravity CG of the craft. It is to be noted that the roll and pitch control will have an augmenting yaw function because as more air is sucked into the main wing 400 and control wing 450 the total thrust of energizing jets 415 and 468 respectively will be modified to some extent. Inasmuch as yaw and roll functions are usually desired simultaneously in flight (banking and turning) the overall control combination is sensitive or "sharp" at all speeds of the craft.

While I have shown and described in detail preferred principles and devices for operating accordingly; it is to be understood that other devices will occur to those skilled in the art pertaining to these principles. Accordingly, I wish not to be limited to the structures disclosed to present these principles and to the particular details thereof; but by the scope of the following claims.

I claim:

1. Aircraft comprising, in combination, a fuselage, a rotor carried forward of said fuselage, at least one engine, means drivingly connecting said engine and said rotor to create a slipstream, a first wing mounted upon said fuselage in a position to receive air from said rotor in an upper segment of the slipstream, said first wing being adapted to be varied in plan-form and area at least one flap for varying said plan-form, a second wing mounted upon said fuselage to receive air from said rotor in a lower segment of the slipstream, said second wing having movable portions, a rudder carried by said fuselage adjacent said rotor and said second wing, control means for moving said movable portions in different senses relative to each other or in the same sense, and means causing said aircraft to attain a predetermined attitude at rest to effect vertical takeoff and landing.

2. Aircraft adapted for hovering and translational flight comprising, in combination, a fuselage, an adjustable area first wing attached to an upper part of said fuselage, an engine attached to said fuselage, a rotor connected to said engine and rotatably attached to said fuselage forward of said first wing, a second wing attached to a lower part of said fuselage relatively forward with respect to said first wing, said second wing being controllable and in the slipstream of said rotor in all attitudes of the aircraft; the center of lift of the aircraft being above and forward of the center of gravity thereof; and control means causing said second wing to change the longitudinal relative position of said center of lift with respect to said center of gravity to vary the attitude of the aircraft in all phases of flight.

3. Aircraft adapted for hovering and translational flight comprising, in combination, a fuselage, an adjustable area first wing attached to an upper part of said fuselage, an engine attached to said fuselage, a rotor connected to said engine and rotatably attached to said fuselage forward of said first wing, a second wing attached to a lower part of said fuselage relatively forward with respect to said first wing, said second wing being controllable and in the slipstream of said rotor in all attitudes of the aircraft; the center of lift of the aircraft being above and forward of the center of gravity thereof; and pitch and roll control means for causing said second wing to change the longitudinal relative position of said center of lift with respect to said center of gravity to vary the attitude of the aircraft, and yaw control means mounted adjacent and at an angle to said second wing and forward of said center of gravity for controlling yawing moments of the aircraft.

4. Aircraft comprising in combination, a fuselage, upper and lower wings connected to said fuselage, said upper wing being shaped both longitudinally and transversely to form a portion of a duct for directing airflow, and an engine powered rotor for forcing air to flow in contact with both of said wings, said lower wing having controllable portions carries on said fuselage forward of the center of gravity of the aircraft for varying the attitude of the aircraft, and extending and retractible flaps aerodynamically cooperable with said upper wing for varying the area and total lift coefficient thereof.

5. Aircraft adapted for vertical takeoff and landing comprising in combination, a fuselage, upper and lower wings connected to said fuselage, said upper wing being shaped both longitudinally and transversely to form a portion of a duct for directing airflow, and an engine powered rotor for forcing air to flow in contact with both of said wings, said lower wing having positionally controllable portions for varying the attitude of the aircraft, extendible and retractable flaps aerodynamically cooperable with said upper wing for varying the total lift coefficient thereof, and land engaging means mounted upon said flaps for engaging a landing surface when said flaps are extended, said land engaging means being retractable with said flaps.

6. Aircraft adapted for vertical takeoff and landing comprising, in combination, a fuselage, a plurality of wings spaced vertically with respect to each other and said fuselage, and a powered rotor carried forward of said wings, the lowermost of said wings being controllable and mounted closer to the plane swept by said rotor for controlling the attitude of the aircraft regardless of relative wind, said lowermost wing having at least a major portion positioned in the slipstream of said rotor and relative wind, the uppermost of said wings forming a transverse arc for forming a portion of a duct directing the slipstream from said rotor above and below said wing and relative wind, and retractable flap means operatively connected with said uppermost wing.

7. Aircraft adapted for vertical takeoff and landing comprising, in combination, a fuselage, a plurality of wings spaced vertically with respect to each other and said fuselage, and a powered rotor carried forward of said wings, the lowermost of said wings being controllable and mounted closer to the plane swept by said rotor for controlling the attitude of the aircraft regardless of relative wind, said lowermost wing having at least a major portion positioned in the slipstream of said rotor, extendible and retractable flap means operatively connected with the uppermost of said wings, and landing means mounted on said flap means for retracting and extension therewith.

8. In aircraft including a fixed wing positioned in the slipstream of a powered rotor, the combination of means for rendering the aircraft operable both in hovering and translational flight comprising, a fuselage mounting said wing and said rotor, said fuselage being positioned in the slipstream of said rotor and shaped with respect with said wing to form portions of a duct, flap means cooperable with said wing for changing the shape of the portion of the duct including the wing, and means for tilting the path of rotation of said rotor to vary the angle of the slipstream thereof with respect to said wing and said fuselage.

9. In aircraft including a fixed wing positioned in the slipstream of a powered rotor, the combination of means for rendering the aircraft operable both in hovering and translational flight comprising, a fuselage fuselage mounting said wing and said rotor, said fuselage being positioned in the slipstream of said rotor and shaped with respect with said wing to form portions of a duct, flap means cooperable with said wing for changing the shape of the portion of the duct including the wing, and means including pitch and roll control means in said slipstream for varying the effectiveness of the slipstream of said rotor upon said wing and said fuselage.

10. In aircraft including a fixed wing positioned in the slipstream of a powered rotor, the combination of means for rendering the aircraft operable both in hovering and translational flight comprising, a fuselage mounting said wing and said rotor, said fuselage being positioned in the slipstream of said rotor and shaped with respect with said wing to form portions of a duct, flap means cooperable with said wing for changing the shape of the portion of the duct including the wing, means for tilting the path of rotation of said rotor to vary the angle of the slipstream thereof with respect to said wing and said fuselage, and ailerons carried by said fuselage in the slipstream said ailerons being movable simultaneously and relatively to control the attitude of the aircraft in pitch and roll.

11. In aircraft including a fixed wing positioned in the slipstream of a powered rotor, the combination of means for rendering the aircraft operable both in hovering and translational flight comprising, a fuselage mounting said wing and said rotor, said fuselage being positioned in the slipstream of said rotor and shaped with respect with said wing to form portions of a duct, flap means cooperable with said wing for changing the shape of the portion of the duct including the wing, means for tilting the path of rotation of said rotor to vary the angle of the slipstream thereof with respect to said wing and said fuselage, ailerons carried by said fuselage in the slipstream, said ailerons being movable to collectively and differentially control the attitude of the aircraft in pitch and roll, and a movable rudder carried by said fuselage in the slipstream, for controlling the yawing attitude of the aircraft.

12. In aircraft including a fixed wing positioned in the slipstream of a powered rotor, the combination of means for rendering the aircraft operable both in hovering and translational flight comprising, a fuselage mounting said wing and said rotor, said fuselage being positioned in the slipstream of said rotor and shaped with respect with said wing to form portions of a duct, variably positionable flap means cooperable with said wing for changing the shape of the portion of the duct including the wing, said wing comprising substantially constant chord sections, and an auxiliary wing mounted below said wing upon said fuselage, a pair of fairings connecting said wing and said auxiliary wing at the tips thereof, movable portions of said fairings connected to said flap means for varying the positions of same, and a movable rudder carried by said fuselage in the slipstream for controlling the yawing attitude of the aircraft.

13. In aircraft, the combination of means forming a portion of a duct for receiving a slipstream and causing relative deceleration of air received from airflow producing means comprising, a fuselage having a longitudinal axis, a transversely slotted adjustable wing mounted with respect to said axis to provide surfaces of the wing spaced with respect to said fuselage to form therewith a portion of the duct, movable means including roll and pitch control means for changing the direction of flow of air over and through said portion of a duct and decelerating the air to a predetermined extent to cause a ground effect pressure rise, and means for establishing flow of air over and through said portion of a duct.

14. Aircraft adapted for vertical takeoff and landing comprising, in combination, upper and lower wings connected together in spaced relationship, said upper wing being shaped both longitudinally and transversely to form a portion of a duct for directing airflow, power operated means for forcing air to flow in contact with both of said wings, said lower wing having controllable portions for varying the attitude of the aircraft, at least one of said wings having perforations on an upper surface, means for educting air from the interior of said wing for causing airflow into said perforations for effecting boundary layer control, and means causing flow into some of said perforations at a greater rate of flow than into other of said perforations to provide control for the aircraft.

15. Aircraft adapted for vertical takeoff and landing comprising, in combination, a fuselage, upper and lower wings connected to said fuselage, said upper wing being shaped both longitudinally and transversely to form a portion of a duct for directing airflow, and an engine powered rotor for forcing air to flow in contact with both of said wings, said lower wing having controllable portions for varying the attitude of the aircraft, at least one of said wings having perforations on an upper surface, means for educting air from the interior of said wing for causing airflow into said perforations for effecting boundary layer control, and means causing flow into some of said perforations at a greater rate of flow than into other of said perforations to provide control for the aircraft.

16. In aircraft including a body, a sustaining wing, a flap cooperable with said wing for augmenting the lift thereof by changing the area thereof, and at least one engine within said body, the combination of an upper surface of said wing containing perforations, duct means between the interior of said wing and said body, means for drawing air into said duct means through the perforations, means in said duct means directing the drawn-in air into heat exchange with said engine, and fluid outlet means for said duct means directing heated air over said flap for modifying the effect thereof and providing thrust, wherein said flap is cambered and transversely curved in an arc to provide a high strength to weight ratio.

17. In aircraft including a body, a sustaining wing, a flap cooperable with said wing for augmenting the lift thereof by changing the area thereof, and at least one engine within said body, the combination of, an upper surface of said wing containing perforations, duct means between the interior of said wing and said body, means for drawing air into said duct means through the perforations, means in said duct means directing the drawn-in air into heat exchange with said engine, and fluid outlet means from said duct means directing heated air over said flap for modifying the effect thereof and providing thrust, wherein the direction of force of said flap is substantially in line with the center of gravity of the aircraft so that the extended flap produces no appreciable change in trim, no appreciable pitching, yawing, or rolling moment on the aircraft over that of said flaps in its retracted position.

18. VTOL aircraft comprising in combination, a body, power operated air impelling means secured to said body for causing a stream of air to flow through said body, said body including air directing means for causing a portion of said stream of air to be directed downwardly and inwardly adjacent said body, and control means for controlling pitching and rolling moments on the aircraft, said control means being located in said airstream and having at least one portion spaced from the centers of lift and gravity of said body, said air directing means and said control means being arranged to decelerate said airstream to cause an aerodynamic jump to occur when the aircraft is both adjacent and removed from the ground.